A. RANDEL.
Potato-Planter.
No. 5,446. Patented Feb. 15, 1848.
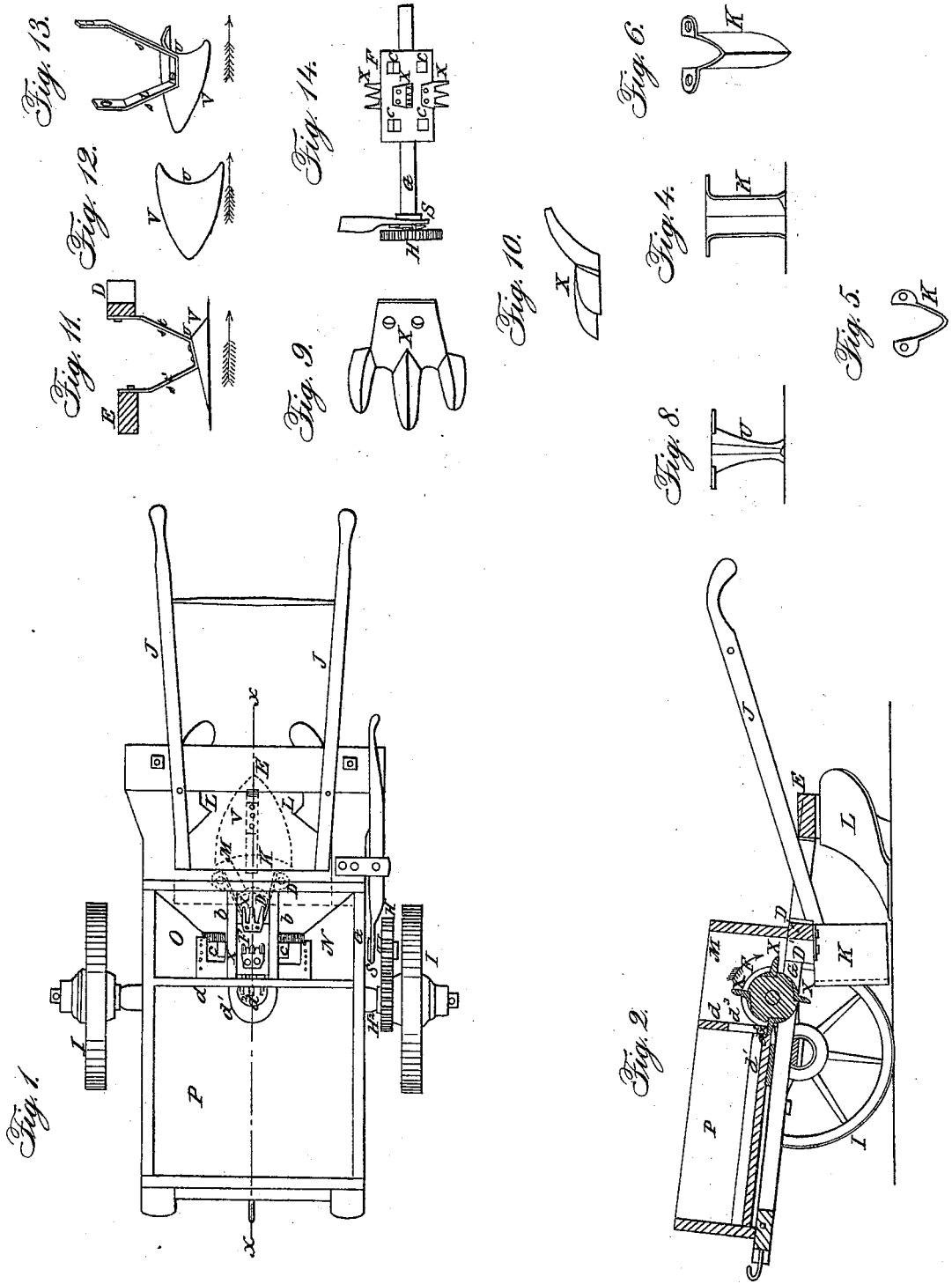

UNITED STATES PATENT OFFICE.

ABRAHAM RANDEL, OF VERONA, NEW YORK.

IMPROVEMENT IN POTATO-PLANTERS.

Specification forming part of Letters Patent No. 5,446, dated February 15, 1848.

*To all whom it may concern:*

Be it known that I, ABRAHAM RANDEL, of the town of Verona, in the county of Oneida and State of New York, have invented a new and useful improvement in the drill-plow for planting or drilling potatoes, corn, beans, and seed, and at the same time dropping stimulating manure—such as lime, plaster, poudrette, &c.—in the hill or drill, which is described as follows, reference being had to the annexed drawings of the same, making part of this specification.

Figure 1 is a top view. Fig. 2 is a longitudinal section on the dotted line $x\,x$ of Fig. 1; Fig. 4, a view of the rear side of the potato-drill. Fig. 5 is a top view of the same. Fig. 6 is a perspective view of the same. Fig. 7 is a front view of a corn-drill. Fig. 8 is a top view of fingers attached to cylinders for planting potatoes; Fig. 9, a side view of the same; Fig. 10, a side view of corn-coverer; Fig. 11, a top view of the same; Fig. 12, a perspective view of the same; Fig. 13, a plan or top view of cylinder.

Similar letters in the several figures refer to corresponding parts.

The nature of my invention consists in constructing a drill barrow or plow on wheels, with suitable apparatus for making a furrow dropping the seed, together with some stimulating manure, and covering them at the same time with plows or scrapers, which serve also for hilling the plants.

To enable others who may be skilled in the art to make and use my invention, I will describe the construction and operation of one which I have found to answer the purpose well.

I make a car or drill-barrow. The frame is five feet six inches long by two feet six inches wide, (excepting that the back end of the side pieces are made four inches wider to support the plows,) supported on two wheels two feet in diameter. A cross-beam, D, is placed two feet from the back end, to the middle of which is secured a furrow-plow, K, (to be described hereinafter,) the beam being cut away, as shown at D' in Figs. 1 and 2, to correspond with plow K.

There are two plows or scrapers, L, twenty-six inches long on the bottom and ten inches high, secured to the back end of the side pieces, (with a block, $e$, two inches thick between them,) one right, the other left, so as to scrape over as much ground as may be desired and turn the furrows toward each other, (see Figs. 1 and 2, letters L L.)

There are handles J J to guide the car, secured to the middle beam, D, and to a bar, E.

Above the frame, and four inches in front of the cross-beam, is an axle, G, extending across the frame, having a cog-wheel, H, on one end to work in a corresponding cog-wheel, $H^2$, attached to the hub of the car or propelling wheel I, and may be ungeared at pleasure by a lever and clutch, S. On the middle of this axle G is a cylinder, F, ten inches long and five inches in diameter, to the middle of which is secured such number of feeders X X (to be described hereinafter) as will distribute the potatoes the desired distance apart.

Toward each end of the cylinder F there are cavities $c\,c$, those at the one end for measuring out the corn, beans, &c., either in hills or in drills, those at the other end for lime, poudrette, &c. (See Figs. 1 and 14.)

On the frame is a box, P, three feet long and two feet four inches wide, with a transverse partition, $d$, eight inches from the back end. This part or division is again divided with two longitudinal partitions, $b\,b$, so as to leave a space, M, three and a half inches in the clear between them, the first partition, $d$, being cut away at $d^2$, between the partitions $b\,b$, half-way up from the bottom, or a suitable height to let the potatoes and feeders X X, Fig. 2, pass freely through. The other apartments, O and N, are lined, so as to form hoppers to correspond with the cavities in the cylinder F.

The bottom of the box P is lower in the middle than at the sides, and at the end where the partition $d$ is cut away a piece is cut out so as to form a hopper, at the bottom of which a grate, $d^2$, of iron or other material, is secured, to correspond with the feeders X X in Fig. 2 (to be described) and prevent the potatoes falling through. (See Figs. 1 and 2.)

The hollow furrow-plow K for potatoes, Figs. 1 and 2, is about twelve inches high, (or such height as will make the furrow the desired depth.) The top is six inches from back to front and seven inches wide. (See Fig. 4.) It then tapers down, and is so bent that the bottom will be three and a half inches wide and four inches deep. (See Fig. 5.) The front will be as Fig. 6. There are projections each side the top, near the back, for screw-bolts to pass through to secure it to the beam D in Fig. 2. (See Figs. 4, 5, 6.)

The furrow plow or colter U for corn is the same size and shape at the top and the same height as that for potatoes, but narrows down to within two inches of the bottom, where it is about one inch and a half in the clear, and so continues to the bottom. (See Fig. 8.)

The feeders X X for potatoes are made with three tines or fingers, and are provided with a flange, through which bolts pass to secure it to the cylinder F. When secured to the cylinder a bird's-eye view would show them as represented in Fig. 9, a side or end view being shown in Fig. 10.

To cover the corn, &c., there is an iron plate, V, so formed that the sides and back end touch the ground, while the middle of the front, at $v$, is raised about two inches above the level. This is secured with braces or straps to the beams D and E. (See Figs. 11, 12, and 13.) The arrows indicate the direction in which the coverer moves. The dotted lines in Fig. 1 show its position in the frame when in operation.

*Operation for drilling potatoes.*—The potatoes are put into the box P, with a person to keep a proper supply in the aperture $d'$, which are prevented from falling through by the grate $d^2$ at the bottom. As the drill advances the feeders X X turn round, and, coming through the grate, receive the potatoes and convey them into the furrow through the hollow plow K, opened by the plow K. At the same time some stimulant, if desired, is dropped into the furrow with them, when the two plows L follow and cover them the desired depth.

For planting corn, broom-corn, beans, &c., I take the potato-plow off and substitute the corn-furrow colter U and covering-iron V, and, putting the seed in the corn-hopper, it is planted in hills or drills, according as the cavities are arranged on the cylinder. The covering-iron V follows and closes the furrow and presses the earth to the seed; or the corn may be planted in ridges with the same plows as the potatoes, except that I substitute a furrow-colter two inches shorter instead of the potato-colter.

What I claim as my invention, and not heretofore known or used to the best of my knowledge, is—

The manner of distributing or taking the potatoes from the hopper and dropping them by the combination of the fingers X, placed at regular intervals round the cylinder F, with the stationary fingers or grates $d^2$ in the bottom of the hopper, substantially in the manner described.

ABRAHAM RANDEL.

Witnesses:
S. S. BREESE,
S. I. BREESE.